March 15, 1960    A. L. SMITH    2,928,250
BREAKWATER BARRIERS OR STRUCTURES
Filed Feb. 15, 1956    2 Sheets-Sheet 1
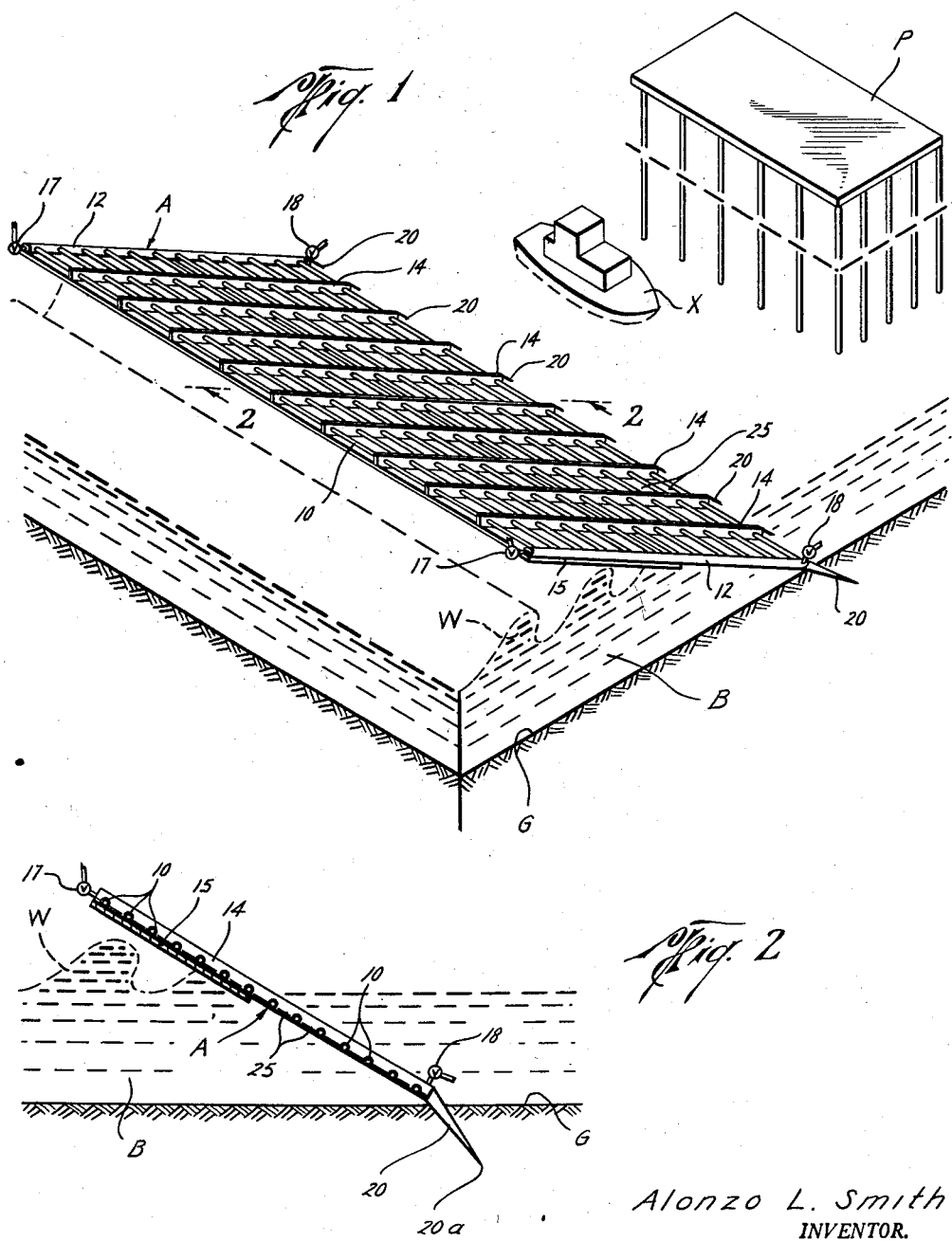
Alonzo L. Smith
INVENTOR.
BY J. Vincent Martin
Joe E. Edwards
B. R. Pravel
ATTORNEYS March 15, 1960 A. L. SMITH 2,928,250
BREAKWATER BARRIERS OR STRUCTURES
Filed Feb. 15, 1956 2 Sheets-Sheet 2
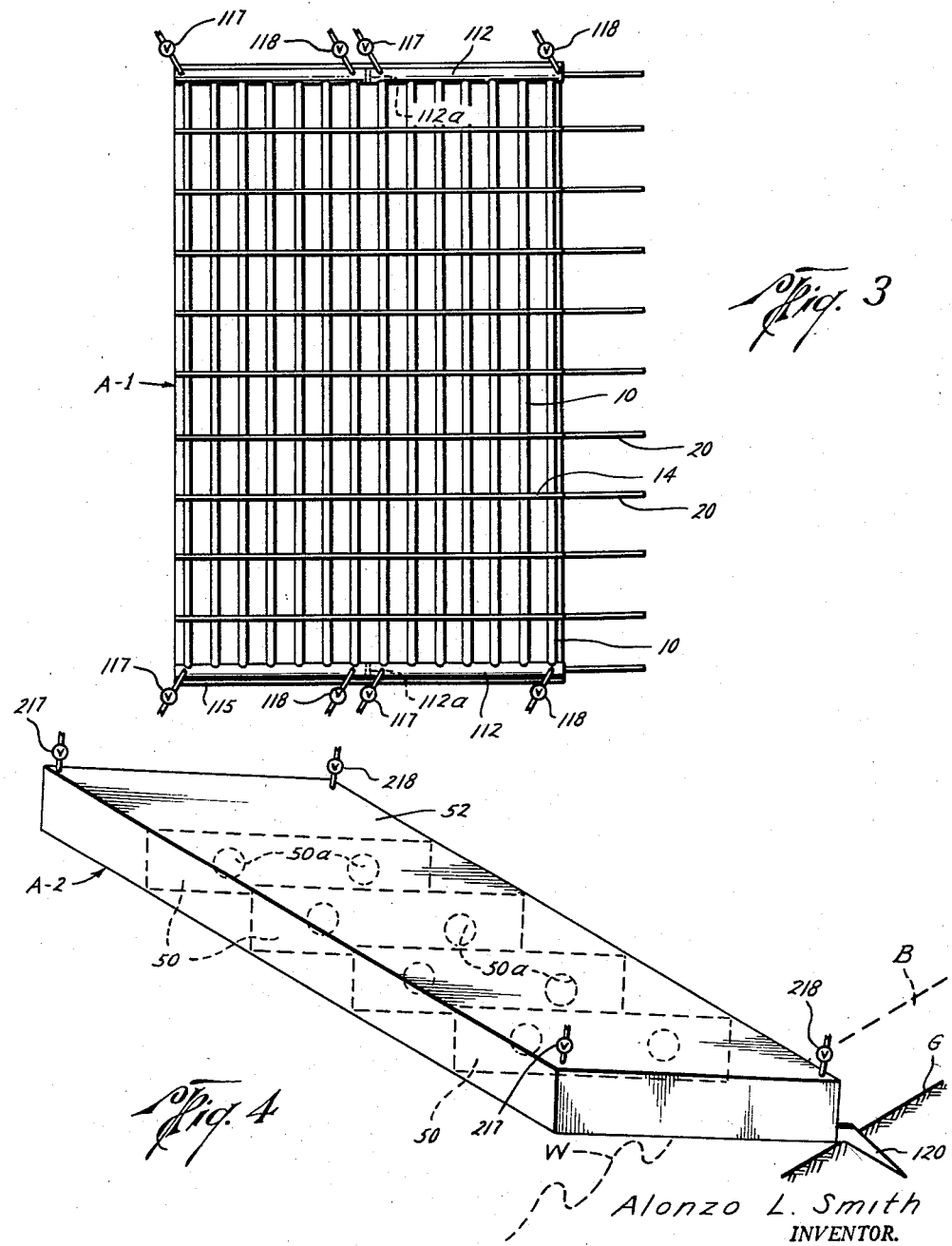

United States Patent Office 2,928,250
Patented Mar. 15, 1960

2,928,250

BREAKWATER BARRIERS OR STRUCTURES

Alonzo L. Smith, Houston, Tex.

Application February 15, 1956, Serial No. 565,735

9 Claims. (Cl. 61—5)

This invention relates to new and useful improvements in breakwater barriers or structures.

An object of this invention is to provide a new and improved breakwater barrier for effecting a quiet zone in rough waters for loading or unloading ships, drilling and production of oil wells in water, construction projects, prevention of erosion and for other instances wherein a quiet zone in the water is desired.

An important object of this invention is to provide a new and improved breakwater barrier which is capable of being floated to a selected location in a body of water and which is adapted to be partially sunk at such selected location so as to be supported in an inclined position with one end thereof on the bottom of the body of water and with the upper portion thereof acting as a movable floating barrier which yieldingly resists the wave action at the water's surface on one side of the barrier so as to create a quiet water surface area on the other side of the barrier.

Another object of this invention is to provide a new and improved breakwater barrier having a plurality of hollow tubular frame members interconnected to form a mat which has at least a portion thereof covered with solid plate to form a wave barrier section, the frame members being filled with air or other gas for floating the barrier to a selected location and such frame members being partially filled with water or other liquid to partially sink said barrier for positioning the barrier section in a position extending both above and below the surface of the water a sufficient distance to prevent the movement of rough waves past such barrier section to the other side thereof.

Another object of this invention is to provide a new and improved breakwater barrier which is formed of hollow interconnected chambers adapted to float on the surface of a body of water when filled with air or other gas and which is adapted to be partially sunk to an inclined position when partially filled with water or other liquids, such barrier having probes on one end of the chambers for extending into the bottom of the body of water when the barrier is partially sunk for thereby preventing any substantial shifting of the barrier from its inclined position as the waves contact the barrier but at the same time permitting a limited buoyancy to the chambers when they are contacted by the waves.

A further object of this invention is to provide a new and improved floatable prefabricated breakwater structure which has one portion thereof covered with solid plate to serve as a barrier section while the rest of the structure has passages therethrough, said structure being provided with means for admitting water or other liquid to the structure at the end thereof, opposite from said barrier section so that only sufficient water or other liquid is admitted to the structure to cause said end to contact the bottom of the body of water in which it is located and with the barrier section extending partially out of the body of water at the surface thereof to provide a barrier for surface waves, the portion of the structure which has the passages permitting circulation of the water below the water's surface.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is an isometric view illustrating one form of the structure of this invention in a position for arresting wave action.

Figure 2 is a cross sectional view taken on line 2—2 of Figure 1.

Figure 3 is a plan view illustrating a modification of the structure illustrated in Figures 1 and 2.

Figure 4 is another modification of the structure of this invention.

In the drawings, the letter A designates generally the breakwater barrier or structure of this invention which is adapted to be positioned in the ocean or any other body of water B for arresting or preventing the passage of waves W past such barrier or structure A, whereby a quiet area is provided on the other side of the structure A. As shown in Figure 1, the quiet area provided by the structure A permits the loading and unloading from a boat X to a platform P and it also provides a quiet area for such other uses as desired, such as drilling and production of oil wells from a platform such as the platform P is facilitated if a quiet zone or area is provided. Also various construction projects such as the building of the fixed platform P in the water are facilitated when a quiet zone is provided on the surface of the water. Also, the structure A can be used in a manner similar to the present sea walls so as to prevent the lashing of waves against the bang and thereby prevent the erosion of such bank by the waves. Other uses of the structure A will occur to those skilled in the art as the construction thereof becomes apparent from the following description.

In Figures 1 and 2, one form of the invention is illustrated wherein the breakwater structure or barrier A is formed by a plurality of longitudinally extending pipes or tubes 10 which are each joined to the lateral headers 12 at each end of the structure or barrier A. The pipes 10 are hollow and are joined to the hollow headers 12 so that fluid, either liquid as gas, can pass from the headers 12 to each of the pipes 10. The pipes 10 are preferably welded to the headers 12 and are thus interconnected to form a hollow structure with the various pipes 10 serving as chambers which are interconnected by the headers 12. The pipes 10 are preferably braced by laterally extending beams or plates 14, each of which is welded or otherwise affixed to each of the pipes 10. Of course, the lateral braces or beams 14 can be connected to the pipes 10 in numerous ways, so long as they do not interfere with the flow of fluids through the pipes 10 and so long as they connect the pipes 10 together to make them into a rigid hollow mat or body. Additionally, more braces than illustrated can be used to further rigidify the structure A.

In order to resist or arrest the waves W, a barrier section is provided by a solid plate 15 which, as shown in Figures 1 and 2, extends for about one-half of the header length. Each header 12 has a valve 17 at the end thereof adjacent to the barrier section or plate 15 for controlling the inlet and outlet of air or other gas to each header 12 and thus to the pipes 10, and valve 18 at the opposite end thereof for controlling the inlet and outlet of water or other liquid to each header 12 and to the pipes 10. As will be explained, when it is desired to float the breakwater structure or barrier A to a selected location, the pipes 10 and the headers 12 are filled with air or other gas so that such structure or barrier A floats on the surface of the body of water B in a position substantially parallel to the bottom or ground G of the body of water B. When the structure A has reached the desired location the valves 18 are opened to admit water or other liquid, preferably the water from the body of water B in which the structure A is floated, and the air or other gas which has previously been in the pipes 10 or the headers 12 is displaced upwardly and out of the open valves 17. As the water enters through the valves 18, it naturally flows into each header 12 and fills the pipes 10 closest to the valves 18 first and then successively fills the rest of the pipes 10 in a direction away from the valves 18. Such filling causes the side or portion of the structure A which is closest to the valves 18 to begin to sink. When sufficient water has entered the pipes 10 to fill about half of same, or at least to fill a sufficient number of the pipes 10 to cause the structure A to assume an inclined position which is preferably a position at about a 30 degree angle with respect to the ground G (Figure 2) the filling of the pipes 10 is stopped by closing the valve 17. During the filling of the structure A with the water to the extent described, precautions are taken to avoid the intake of water through the valves 17. To this end tubes or hoses or any other suitable means are provided (not shown) for maintaining the outer ends of the valve 17 above the surface of the water W during the partial sinking of the structure A to its inclined position.

The end of the structure or barrier A which sinks downwardly as indicated in Figures 1 and 2 has probes or anchoring members 20 which are preferably connected to the ends of each of the headers 12 and also to the ends of one or more of the beams 14. Each of the probes 20 is provided with a pointed end 28a to facilitate the projection thereof into the bottom or ground G. Such probes or anchoring members 20 dig into the ground or bottom G when the structure or barrier A is sunk so as to hold the side or end of the structure A which is adjacent to ground or bottom G substantially fixed while at the same time permitting the structure A to swing or float as the waves W act on the barrier plate 15, as will be more evident hereinafter.

In the operation or use of the breakwater structure or barrier A, it is floated to the desired location with the pipes 10 and the header 12 filled with air or other gas. When the selected location has been reached, the valve or valves 18 and the valve or valves 17 are opened so that water is admitted into the headers 12 through the valve or valves 18 and the displaced air or other gas is discharged or exhausted through the valve or valves 17. As previously stated, precautions are taken to prevent the admission of water through the valves 17 initially so that the sinking of structure or barrier A begins at the side at which the valves 18 are located. The water is admitted through the valves 18 so that it successively fills the pipes 10 starting from the pipe 10 closest to the valves 18. When a sufficient number of the pipes 10 have been filled with water to position the end of the structure A with its probes or anchoring members 20 in the ground G, as indicated in Figures 1 and 2, so that the structure A is at an angle of about 30 degrees to the bottom G, then the valves 17 are closed so that the remaining pipes 10 are still filled with air or other gas, whereby the structure A still retains its bouyancy, at least partially, so that the plate 15 extends above the surface of the body of water B. Ordinarily the plate 15 is of sufficient width to not only extend above the surface of the body of water B but to also extend into the body of water B to some extent, at least a sufficient distance to prevent the waves W from passing beyond the plate 15. The relatively undisturbed or quiet waters below the waves W at the surface of the body of water pass through the spaces or passages 25 between the pipes 10. The probes 20 are forced into the ground G when the structure or barrier A is sunk to its inclined position and such probes 20 prevent the end or side of the structure A which is in the water from shifting to any extent once the probes 20 have become embedded in the ground or bottom G. However, since the upper pipes 10 are still filled with air or other gas, the structure A has some buoyance which permits a buoyant swinging in response to the waves contacting the barrier plate 15 and the probes 20 do not prevent such buoyant movement. Ordinarily, the probes 20 are inclined downwardly at an angle of about 15 degrees with respect to the plane of the structure or barrier A to increase the digging action of the probes 20, but it will be appreciated that the probes 20 will still accomplish their purpose if positioned at angles other than the 15 degree angle indicated in the drawings.

With the structure or barrier A positioned as indicated in Figures 1 and 2, the waves W are arrested or rolled back so as to break up the waves and prevent them from passing to the area on the other side of the structure or barrier A whereby the quiet zone for the boat X and the platform P is provided on the surface of the body of water B. Since the barrier A is buoyant or floatable within limits, it provides a yielding barrier so that the force of the waves W is expended by tending to lift or raise the barrier A upwardly. In this connection, it should be pointed out that the length of the headers 12, or in other words the width of the barrier A, should be at least two or three times the height of the body of water B in which the barrier A is positioned. With such a construction the wave force W would have to be great enough to actually lift the entire barrier A to a substantially vertical position from its inclined position shown in Figure 2 in order to turn over the barrier A. It will be appreciated that with the headers 12 approximately three times the depth of the water B, two-thirds of the barrier A would have to be forced out of the water, which of course would be practically impossible and would therefore prevent any turning over of the barrier A of this invention.

In the event the barrier A is to be moved from a location where it is positioned, the water or other liquid is forced out of the pipes 10 in which it had previously been admitted by admitting air under pressure through the valve or valves 17 above the surface of the body of water B. Thus, the entire barrier A is again made buoyant so that it floats substantially parallel to the ground or bottom G for movement to a different location.

In Figure 3 a modification of the barrier A is illustrated and such modified construction is designated by A-1. Many of the parts of the barrier A-1 are identical with the parts illustrated in the barrier A of Figures 1 and 2 and therefore like parts have the same numerals. The headers 112 in Figure 3 are identical with the headers 12 of Figures 1 and 2 except that a closure plate 112a is disposed about the midway of the length of the headers 112 to divide the headers 112 into two section or headers. Each of the sections of the headers 112 has a pair of air valves 117 and a pair of water valves 118. With such arrangement the valves 117 and 118 which are on the sections of the headers 112 that are closest to the probes 20 are opened to admit water thereto so as to fill the pipes 10 which are joined with those sections of the headers 112 to the right of the closure plates 112a (Figure 3). With such arrangement, there ordinarily would be no necessary for admitting any water to the sections of the headers 112 to the left of the closure plates 112a (Figure 3) unless it was desired to sink the entire structure, because the filling of the pipes to the right of the closure plates 112a with water is sufficient to partially sink the barrier A to its inclined position.

Although the valves 117 for the sections of the headers 112 which are adjacent to the probes 20 are accessible to a diver, even after submerged it is believed evident that they may be made accessible above the surface of the water by extending the pipes connected thereto and positioning such valves 117 substantially adjacent to the other valves 117 at the left hand end of the barrier A–1 of Figure 3.

Another modification of Figure 3 resides in the use of a barrier plate 115 which is solid and which covers the entire lower portion of the barrier A. By providing the plate 115 so as to cover the entire lower portion of the barrier A, even the relatively calm waters below the surface of the body of water B are prevented from flowing past the barrier A which in some cases is desirable. Of course, it will be appreciated that a partial plate 15 such as is shown in Figure 2 could be used with the modification of Figure 3, since it is not necessary to use the complete solid plate 115 merely because the head or sections 112 are divided by the closure plates 112a.

The operation and use of the modification of Figure 3 is identical with the operation and use of the form of the invention shown in Figures 1 and 2, except that the valves 117 and 118 on the right sections of the headers 112 adjacent to the probes 20 are the only valves which are ordinarily opened for positioning or partially sinking the barrier A–1 to its inclined position, which is preferably at an angle of inclination of about 30 degrees with respect to the ground or bottom G.

Another modification of this invention is illustrated in Figure 4 wherein the barrier A–2 is formed as a closed hull which has reinforcing plates such as those illustrated in dotted lines and identified by the numerals 50 in Figure 4. The plates 50 divide the hull 52 into hollow compartments which are interconnected by the openings 50a in each of the braces or reinforcing plates 50. The hull has probes or anchoring members 120 fixed to one side or end thereof, preferably at an angle of about 15 degrees with respect to the plane of the hull 52 so as to dig into the ground or bottom G of the body of water B in the same manner as described above in connection with the form of the invention shown in Figures 1 and 2. The valves 217 and 218 are likewise provided, which correspond with the valves 17 and 18 of Figures 1 and 2.

Thus, in the operation or use of the form of the invention shown in Figure 4, the hull 52 is filled with air or other gas and it floats on the surface of the body of water B so that it can be moved to the desired location for positioning it at the inclined barrier position corresponding to that shown in Figures 1 and 2. When the predetermined or selected location has been reached the valves 218 are opened to admit liquid, preferably the water from the body of water B, into the interior of the closed hull 52. The valves 217 are opened to exhaust the air which is displaced by the liquid entering the hull 52 through the valves 218. Water is admitted into the hull 52 until it sinks on one side thereof to assume the inclined position corresponding to that shown in Figures 1 and 2 and in such position the probes 120 are of course projected or embedded into the ground or bottom G. The valves 217 are then closed so that the hull 52 is only partially filled with water and therefore it has a buoyancy so that it yieldingly resists or arrests the waves W as they contact the lower side of the hull 52. It will be also appreciated that the barrier A–2 can be raised from its inclined position by admitting compressed air or other gas through the valves 217 to displace the water or other liquid from the interior of the hull 52 so that the hull 52 again is floatable substantially parallel to the bottom or ground G.

It will also be evident that additional braces or reinforcements can be provided in the interior of the hollow hull 52. In all forms of the invention, the barrier is preferably inclined in use at an angle of about 30 degrees with respect to the bottom or ground G, but it should be noted that the invention is not limited to such angle because the barrier as shown in the various forms illustrated in the drawings can be positioned at different angles than the 30 degree angle and still perform its intended purpose. In fact, the barrier in all of the forms shown can even be inclined at an opposite angle to that shown in Figure 2, in which case the waves tend to roll up the barrier plate 15, 115 or the bottom of the hull 52, but the barrier projects out of the water sufficiently to prevent the waves from rolling over and past the barrier. It will thus be evident that the barriers of this invention may be inclined at various angles with respect to the ground so long as the barrier projects above the water's surface a sufficient distance to prevent the waves from moving past the barrier to the other side thereof.

The foregoing disclosures and description of the invention is illustrative and explanatory thereof, and various changes in the size, shape and materials, as well as in the details of the illustrated construction may be made, within the scope of the appended claims, without departing from the spirit of the invention.

What is claimed is:

1. A breakwater barrier, including a flat raft-like hollow body, a solid barrier section on at least one side of said body, valve means on said body for admitting a gas to said hollow body to float same in a body of water in a position substantially parallel to the bottom of the body of water, valve means on said hollow body to admit liquid to the other side of said hollow body to partially fill same and to cause an edge of the body remote from the barrier section to sink in the water for inclining said hollow body at an angle with respect to said bottom and with said solid barrier section being positioned at the water's surface, the buoyancy of said body being sufficient to maintain at least a portion of said barrier section above water level when sufficient liquid is admitted to sink said other side into contact with the bottom of the body of water, whereby waves contacting said barrier section are yieldingly arrested to create a quiet area on the water's surface on the other side of barrier section, and anchoring means on said edge of the hollow body for embedding in said bottom to prevent shifting of said edge while at the same time permitting limited buoyant swinging of said hollow body in response to the force of waves acting against the barrier section.

2. The structure set forth in claim 1, wherein said hollow body includes, a plurality of longitudinally extending pipes and a header connected at each end of pipes to establish fluid communication between the pipes to effect the filling with the gas and the partial filling with the liquid.

3. The structure set forth in claim 1, wherein said hollow body includes, a plurality of longitudinally extending pipes and a header connected at each end of the pipes to establish fluid communication between the pipes, and wherein said solid barrier section is a solid plate which is secured to a portion of said pipes.

4. The structure set forth in claim 1, wherein said hollow body is a substantially rectangular hull, and wherein said solid barrier section is provided by a bottom plate of said hull.

5. A breakwater barrier, including a plurality of longitudinally extending pipes, a pair of header pipes at opposite ends of said pipes for interconnecting same and for establishing fluid communication from the headers to each of said pipes, a first valve at one end of each header for controlling the inlet and outlet of liquid to the pipes for the sinking and the raising of the barrier in a body of water, a second valve at the other end of each header for controlling the inlet and outlet of gas for also controlling the sinking and the floating of said pipes of the barrier whereby the pipes may be positioned in a plane substantially parallel to the bottom of the body of water and at the surface of the water for floating same to different locations and thereafter said pipes may be partially filled with water or other liquid to assume an inclined position for use as a barrier in the body of water, a barrier plate connected to and extending longitudinally along the pipes from the end of said header having said second valve and anchoring means attached to the ends of said headers having said first valve, said barrier plate arresting waves on the surface of said body of water to prevent their movement past the barrier whereby a quiet zone is provided on the other side of the barrier plate on the surface of the body of water, the buoyancy of said barrier being sufficient to maintain at least a portion of said barrier above water level when sufficient liquid is admitted to sink one end of the barrier into contact with the bottom of the body of water.

6. The structure set forth in claim 5, including lateral reinforcing members connected to the pipes for spanning the spaces between the pipes.

7. A breakwater barrier, including a plurality of longitudinally extending pipes, a header pipe at one end of said pipes for interconnecting same and for establishing fluid communication from the header to each of said pipes, a first valve at one end of said header for controlling the inlet and outlet of liquid to the pipes for the sinking and the raising of the barrier in a body of water, a second valve at the other end of said header for controlling the inlet and outlet of gas for also controlling the sinking and the floating of said pipes of the barrier whereby the pipes may be positioned in a plane substantially parallel to the bottom of the body of water and at the surface of the water for floating same to different locations and thereafter said pipes may be partially filled with water or other liquid to assume an inclined position for use as a barrier in the body of water, and a barrier plate connected to and extending longitudinally along the pipes from the end of said header having said second valve, said barrier plate arresting waves on the surface of said body of water to prevent their movement past the barrier whereby a quiet zone is provided on the other side of the barrier plate on the surface of the body of water, a second header pipe parallel to said first header pipe, said second header pipe being connected to the opposite ends of said longitudinally extending pipes and establishing fluid communication with each of said pipes, a first valve on said second header in longitudinal alignment with said first valve on said first header, a second valve on said second header in longitudinal alignment with said second valve on said first header, said first valves controlling the inlet and outlet of water or other liquid to the headers and to the pipes while the second valves control the inlet and outlet of gas to the headers and to the pipes, and anchor means attached to the edge of the barrier which is positioned closest to the bottom of the body of water when the barrier is in an inclined position.

8. A breakwater barrier, including a flat raft-like hollow body, a solid barrier section on at least one side of said body, valve means on said body for admitting a gas to said hollow body to float same in a body of water in a position substantially parallel to the bottom of the body of water, valve means on said hollow body to admit liquid to the other side of said hollow body to partially fill same and to cause an edge of the body remote from the barrier section to sink in the water for inclining said hollow body at an angle with respect to said bottom and with said solid barrier section being positioned at the water's surface, the buoyancy of said body being sufficient to maintain at least a portion of said barrier section above water level when sufficient liquid is admitted to sink said other side into contact with the bottom of the body of water, whereby waves contacting said barrier section are yieldingly arrested to create a quiet area on the water's surface on the other side of barrier section, and pointed probes on the edge of said hollow body which is disposed on the bottom of the water for digging into said bottom to retard the shifting movement of said barrier, said probes being inclined downwardly at an angle with respect to the plane of the hollow body so that when the barrier is partially sunk to its inclined position the probes are embedded in the bottom at a greater angle with respect thereto than the angle of inclination of the hollow body with respect to the bottom.

9. A breakwater barrier, including a plurality of longitudinally extending pipes, a pair of header pipes at opposite ends of said pipes for interconnecting same and for establishing fluid communication from the headers to each of said pipes, a first valve at one end of each header for controlling the inlet and outlet of liquid to the pipes for the sinking and the raising of the barrier in a body of water, a second valve at the other end of each header for controlling the inlet and outlet of gas for also controlling the sinking and the floating of said pipes of the barrier whereby the pipes may be positioned in a plane substantially parallel to the bottom of the body of water and at the surface of the water for floating same to different locations and thereafter said pipes may be partially filled with water or other liquid to assume an inclined position for use as a barrier in the body of water, a barrier plate connected to and extending longitudinally along the pipes from the end of said header having said second valve, said barrier plate arresting waves on the surface of said body of water to prevent their movement past the barrier whereby a quiet zone is provided on the other side of the barrier plate on the surface of the body of water, the buoyancy of said barrier being sufficient to maintain at least a portion of said barrier above water level when sufficient liquid is admitted to sink one end of the barrier into contact with the bottom of the body of water, and anchoring probes positioned on the pipe of said barrier which is positioned closest to the bottom of the body of water when the barrier is in an inclined position, said probes having means for embedding or projecting into the bottom of the body of water to prevent shifting of the barrier while at the same time permitting limited buoyant swinging thereof in response to the force of the waves acting against the barrier plate.

References Cited in the file of this patent

UNITED STATES PATENTS

| | | |
|---|---|---|
| 436,644 | White | Sept. 16, 1890 |
| 1,385,166 | Bagnall | July 19, 1921 |
| 2,185,458 | Giliasso | Jan. 2, 1940 |
| 2,551,375 | Hayward | May 1, 1951 |
| 2,584,867 | Guarin | Feb. 5, 1952 |

FOREIGN PATENTS

| | | |
|---|---|---|
| 2,671 | Great Britain | of 1868 |
| 3,511 | Great Britain | of 1869 |